UNITED STATES PATENT OFFICE.

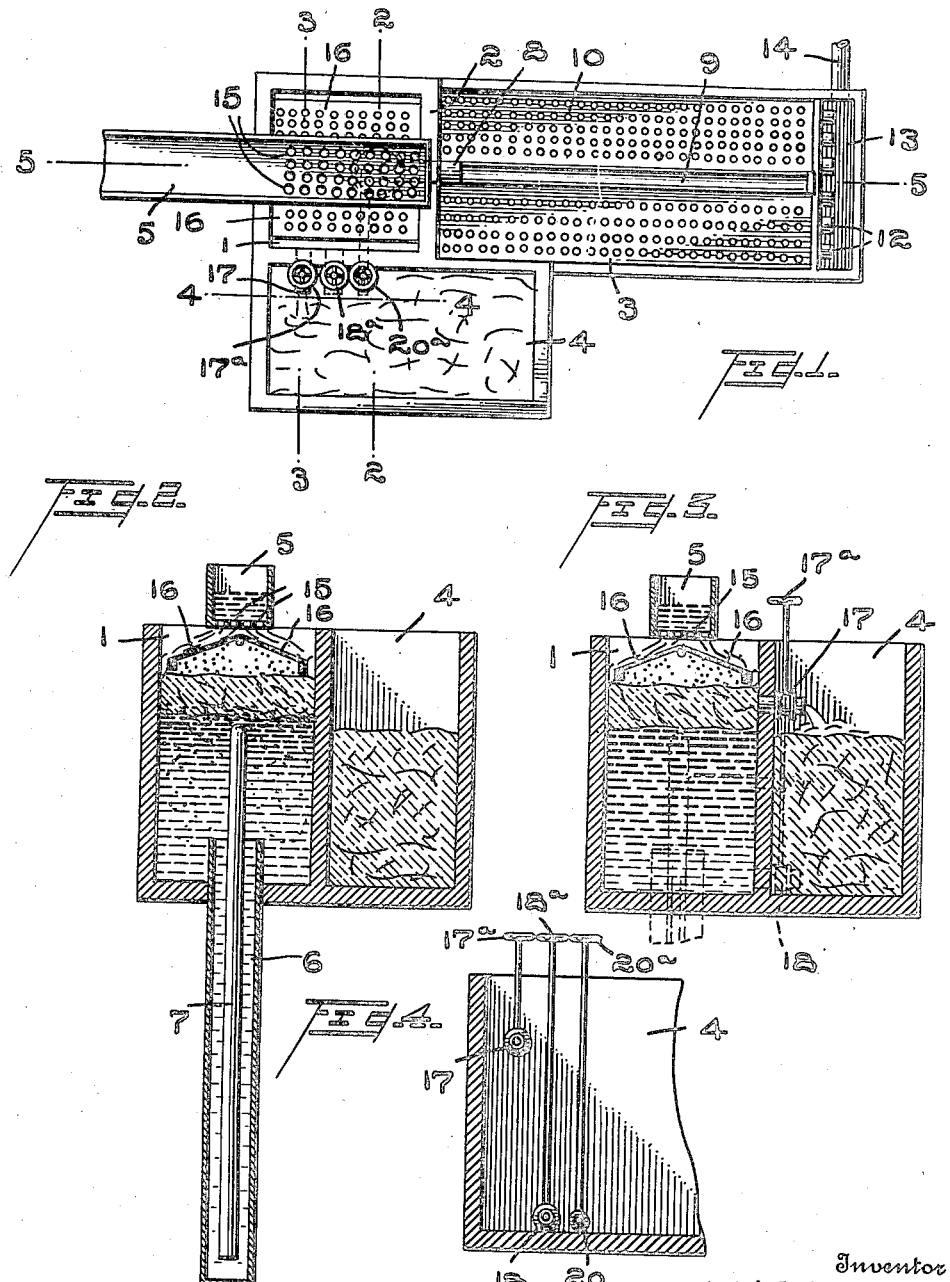

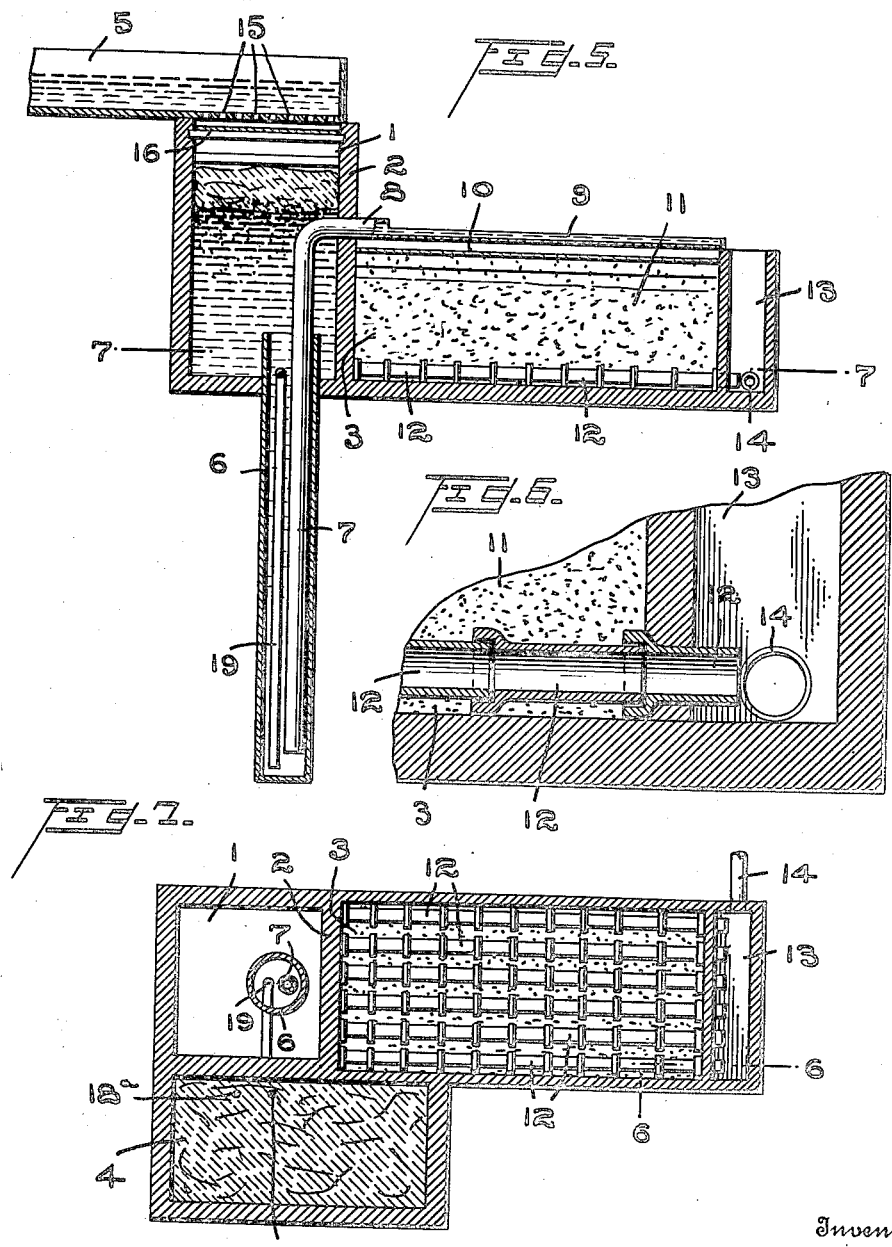

JOSEPH E. VAN KIRK, OF MERCHANTVILLE, NEW JERSEY.

SEWAGE APPARATUS.

1,126,136.      Specification of Letters Patent.      Patented Jan. 26, 1915.

Application filed October 10, 1914.   Serial No. 866,020.

*To all whom it may concern:*

Be it known that I, JOSEPH E. VAN KIRK, a citizen of the United States, residing at Merchantville, in the county of Camden and State of New Jersey, have invented certain new and useful Improvements in Sewage Apparatus, of which the following is a specification.

My invention relates to improvements in sewage apparatus, the object of the invention being to provide an improved apparatus for disposing of sewage in which apparatus nature's laws are permitted to be carried out, and the liquid is freed of sludge and injurious matter.

A further object is to provide an improved apparatus having a septic tank in which all solid matter will be retained and allowed to escape only at the will of the operator who will, from time to time, permit the discharge of the solid matter from the septic tank into a sludge pit.

A further object is to provide in the septic tank, a relatively deep well, the wall of which extends up above the bottom of the septic tank, and connects a water discharge pipe to the bottom of the well, so that through the said pipe only, liquid entirely free of solid particles can pass.

With these and other objects in view, the invention consists in certain novel features of construction and combinations and arrangements of parts as will be more fully hereinafter described and pointed out in the claims.

In the accompanying drawings: Figure 1 is a top plan view illustrating my improved apparatus. Fig. 2 is a view in vertical transverse section on the line 2—2 of Fig. 1. Fig. 3 is a similar view on the line 3—3 of Fig. 1. Fig. 4 is a fragmentary view in section on the line 4—4 of Fig. 1. Fig. 5 is a view in vertical longitudinal section on the line 5—5 of Fig. 1. Fig. 6 is a fragmentary view in vertical longitudinal section on the line 6—6 of Fig. 7, and Fig. 7 is a view in horizontal section on the line 7—7 of Fig. 5.

In constructing my improved apparatus, I preferably employ cement, bricks laid in cement, or other material to form the walls of the several tanks and receptacles, and arrange such tanks and receptacles as will now be described.

1 represents a septic tank which is separated by a partition wall 2 from a filter bed 3, and at one side of the tank 1 and filter bed 3, I provide a sludge pit 4, these several parts of the apparatus being of a size to accommodate the amount of sewage to be cared for. The walls of the septic tank 1 and sludge pit 4 extend above the walls of the filter bed 3, so that I can utilize the well known principle of liquid seeking its own level to compel the apparatus to carry out a continuous operation without employing any mechanical means for forcing the sewage.

6 represents a relatively deep well, the walls of which extend through the bottom of the septic tank and above the bottom of the septic tank a distance sufficient to prevent particles of solid matter accumulating on the bottom of the septic tank from passing over the upper end of the well.

A pipe 7 extends from a point adjacent the bottom of the well 6 to a point in line with the top of the filter bed, and this pipe 7, at its discharge end 8, projects through the wall of the septic tank 1, and communicates with a longitudinal distributing trough 9. This trough 9 is positioned centrally over the filter bed 3, and the water overflowing therefrom is directed onto inclined perforated screens 10 through which the water falls in drops or rain onto a bed of filtering material 11 such as sand, gravel, or other mechanical filtering means.

In the bottom of the filtering bed, a series of longitudinally positioned outlet pipes 12 are provided. These pipes 12 are made up of sections having loose joints so that the water may readily find entrance into the pipes, and said pipes discharge into an outlet tank 13 at the end of the filtering bed from which latter the water escapes through a drain pipe 14.

Above the septic tank 1, a sluice box 5 is located. This sluice box receives the sewage, and is provided with openings 15 in its bottom through which the sewage falls onto inclined screens 16.

It will be noted, particularly by reference to Figs. 2 and 3. that the inclined screens extend downwardly in both directions from a central point, but terminate short of the walls of the septic tank, so that particles of sewage too large to pass through the perforations of the screens, will be washed over the edges of the screens and fall into the septic tank.

At a point slightly below the sludge level of the septic tank, I locate a discharge cock 17 which extends through the wall of the septic tank, and is adapted to direct the sludge into the sludge pit 4. At the bottom of the septic tank 1, I provide a drain cock 18 which drains the septic tank into the sludge pit. To permit the well 6 to be cleaned of sand, gravel, and other small particles which might accumulate in the bottom thereof, I provide a pipe 19 which extends to the bottom of the well, and at its upper end projects through the wall of the well and through the wall of the septic tank at the bottom of the septic tank into the sludge pit, and is provided at its outlet end with a cock 20. The cocks 17, 18, and 20 are each provided with operating hand wheels $17^a$, $18^a$, and $20^a$ respectively located above the wall of the sludge pit, so that an operator can walk along the wall and control the cocks.

The operation of the apparatus is as follows: The sewage is conducted to the sluice box 5, and drops through the openings in the bottom of the latter onto the screens 16, the water passing through the perforations in the screens, and the solid matter washing over the screens into the septic tank below. The sludge will float on top of the water, so that a relatively deep section of sludge will be maintained on top of the water in the septic tank. The water falling through the screens in drops or rain, percolates through the sludge, and any particles of sludge in suspension in the water will be retained by the layer of sludge. Of course, small particles will be found in the liquid below the thickness of sludge at the top, but these particles will either remain in suspension or will float to the top and add to the depth of the sludge. As the well 6 is relatively deep, no particle of sludge can penetrate to the bottom of the well because of the density of the water, and hence from the pipe 7 only water entirely freed of sludge can flow into the trough 9. This operation of the flow of water to the trough 9 is a continuous one so long as sewage is falling from the sluice box into the septic tank. The liquid freed of its sludge overflows from the trough 9, and passes through the screens 10 in the form of drops or rain, and this liquid is thoroughly filtered as it passes through the material 11, and finds an outlet through the pipes 12 as above explained. As the sludge accumulates on top of the liquid in the septic tank, it is necessary from time to time for the operator to open the cock 17 and allow the sludge to pass into the sludge pit 4. It is also desirable from time to time to open the cock 20, and allow the sand, gravel, and other particles accumulating in the bottom of the well to be forced outward through the pipe 19. As soon as the cock 20 is open, the pressure of water will clean out the bottom of the well, and then the cock is closed. Whenever it is desired to drain the septic tank, the cock 18 is opened, at which time it is of course necessary to remove the contents of the sludge pit in order to allow the contents of the septic tank to flow therein.

It will be noted that the water passing through the screens, both in the septic tank and the filtering bed, is allowed a considerable fall before coming in contact with the contents of the septic tank or filtering bed. This water in drops or rain is thoroughly aerated in its fall, so that it is freed to a large extent from its gases and odors.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. The combination with a septic tank, of a well below the septic tank and communicating therewith, and an outlet pipe communicating with the bottom of the well, said pipe having its outlet end located in a plane below the liquid level in the septic tank, substantially as described.

2. The combination with a septic tank, of a well in the bottom of the tank having its wall extending above the bottom of the tank, and an outlet pipe discharging through the wall of the septic tank and extending to the bottom of the well, said pipe having its outlet end located in a plane below the liquid level in the septic tank, substantially as described.

3. In an apparatus of the character described, the combination with a septic tank, a sludge pit, and a filter bed, of a well communicating with the bottom of the septic tank, an outlet pipe connecting the bottom of the well with the filter bed, and means for directing sludge from the upper portion of the septic tank into the sludge pit, substantially as described.

4. In an apparatus of the character described, the combination with a septic tank, a sludge pit, and a filter bed, of a well communicating with the bottom of the septic tank, an outlet pipe connecting the bottom of the well with the filter bed, means for directing sludge from the upper portion of the septic tank into the sludge pit, said septic tank having inclined screens in its upper portion terminating short of the walls of the tank, and means for directing sewage onto said screens, substantially as described.

5. In an apparatus of the character described, the combination with a septic tank, a sludge pit, and a filter bed, of a well communicating with the bottom of the septic tank, an outlet pipe connecting the bottom of the well with the filter bed, means for directing sludge from the upper portion of the septic tank into the sludge pit, said filtering bed having inclined screens at its top with a trough extending longitudinally of the filter bed and communicating with said outlet pipe, substantially as described.

6. In an apparatus of the character described, the combination with a septic tank, a sludge pit, and a filter bed, of a well communicating with the bottom of the septic tank, an outlet pipe connecting the bottom of the well with the filter bed, means for directing sludge from the upper portion of the septic tank into the sludge pit, a clean out pipe communicating with the bottom of the well and discharging into the sludge pit, and a cock on said clean out pipe, substantially as described.

7. In an apparatus of the character described, the combination with a septic tank, a sludge pit, and a filter bed, of a well communicating with the bottom of the septic tank, an outlet pipe connecting the bottom of the well with the filter bed, means for directing sludge from the upper portion of the septic tank into the sludge pit, means for directing sewage into the top of the septic tank and screening the sewage as it enters the same, and means for draining the septic tank into the sludge pit, substantially as described.

8. The combination with a septic tank, a sludge pit adjacent the same, and a filtering bed, said filtering bed having a series of drain pipes in the bottom thereof, the sections of which are open to the entrace of water, of a well located below the septic tank and having its upper end projecting above the bottom of the septic tank, an outlet pipe communicating with the bottom of the well and discharging into the filtering bed, said filtering bed having filtering material thereon above and around the first-mentioned pipes and having perforated screens above the filtering material, and said filtering bed having at one end a drain compartment in which all of the first-mentioned pipes discharge, substantially as described.

In testimony whereof I have signed my name to this specification in the presence of two subscribing witnesses.

JOSEPH E. VAN KIRK.

Witnesses:
C. R. ZIEGLER,
S. W. FOSTER.